(12) United States Patent
Sato et al.

(10) Patent No.: US 11,454,551 B2
(45) Date of Patent: Sep. 27, 2022

(54) TEMPERATURE SENSOR AND TEMPERATURE MEASURING DEVICE

(71) Applicant: DENSO CORPORATION, Kariya (JP)

(72) Inventors: Motoki Sato, Kariya (JP); Takahiro Ogura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/944,422

(22) Filed: Jul. 31, 2020

(65) Prior Publication Data

US 2020/0363271 A1    Nov. 19, 2020

Related U.S. Application Data

(63) Continuation of application No. PCT/JP2019/002626, filed on Jan. 28, 2019.

(30) Foreign Application Priority Data

Jan. 31, 2018 (JP) .............................. JP2018-015627

(51) Int. Cl.
  *G01K 7/02* (2021.01)
  *G01K 1/10* (2006.01)
  *G01K 13/02* (2021.01)
  *G01K 13/024* (2021.01)

(52) U.S. Cl.
  CPC ............... *G01K 7/02* (2013.01); *G01K 1/10* (2013.01); *G01K 13/02* (2013.01); *G01K 13/024* (2021.01); *G01K 2205/02* (2013.01); *G01K 2205/04* (2013.01)

(58) Field of Classification Search
  USPC .................................................. 374/179, 208
  See application file for complete search history.

(56) References Cited

U.S. PATENT DOCUMENTS

| | | | | |
|---|---|---|---|---|
| 4,485,263 A | * | 11/1984 | Itoyama ................... | G01K 1/08 136/230 |
| 5,181,779 A | * | 1/1993 | Shia ........................ | G01K 1/105 136/232 |
| 5,498,296 A | * | 3/1996 | Sawada ................... | H01L 35/20 136/201 |
| 5,520,461 A | * | 5/1996 | Curry ....................... | G01K 1/10 136/232 |
| 5,696,348 A | * | 12/1997 | Kawamura ............. | G01K 1/125 136/201 |

(Continued)

FOREIGN PATENT DOCUMENTS

| | | | | |
|---|---|---|---|---|
| CN | 108048839 A | * | 5/2018 | ........... C23C 28/048 |
| JP | H06-229837 | | 8/1994 | |

(Continued)

*Primary Examiner* — Mirellys Jagan
(74) *Attorney, Agent, or Firm* — Nixon & Vanderhye P.C.

(57) ABSTRACT

A temperature sensor includes a pair of thermocouple wires, a temperature measuring junction formed by joining tip ends of the pair of thermocouple wires together, an outer tube having a tip end in which the temperature measuring junction is held, an insulator insulating the pair of thermocouple wires from the outer tube, and a glass seal filled in a base end of the outer tube. The pair of thermocouple wires disposed in the outer tube have surfaces where passive films are respectively formed due to the oxidization of the metallic materials on the surfaces of the pair of thermocouple wires.

7 Claims, 17 Drawing Sheets

(56) References Cited

U.S. PATENT DOCUMENTS

| | | |
|---|---|---|
| 2007/0258506 A1 | 11/2007 | Schwagerman et al. |
| 2008/0205483 A1* | 8/2008 | Rempe .................... H01L 35/34 |
| | | 374/179 |
| 2016/0231181 A1* | 8/2016 | Maruko .................... G01K 7/04 |
| 2018/0073936 A1 | 3/2018 | Ozeki et al. |
| 2020/0194652 A1* | 6/2020 | Skifton .................... H01L 35/34 |

FOREIGN PATENT DOCUMENTS

| | | |
|---|---|---|
| JP | 2015-59865 | 3/2015 |
| JP | 2016-133369 | 7/2016 |
| JP | 2016-211855 | 12/2016 |
| KR | 10-2007-0100474 | 10/2007 |

* cited by examiner

TEMPERATURE MEASUREMENT RANGE (°C)

TEMPERATURE SENSOR AND TEMPERATURE MEASURING DEVICE

CROSS-REFERENCE TO RELATED APPLICATION

The present application is a continuation application of International Application No. PCT/JP2019/002626 filed on Jan. 28, 2019, which is based on and claims the benefit of priority from Japanese Patent Application No. 2018-015627 filed Jan. 31, 2018. The contents of these applications are incorporated herein by reference in their entirety.

BACKGROUND

The present disclosure relates to a temperature sensor and a temperature measuring device.

Temperature sensors including a pair of thermocouple wires are used for measuring the temperature of exhaust gas, for example, flowing through the exhaust pipe of a vehicle. Such a pair of thermocouple wires are fixed to the interior of an outer tube in a state of being insulated by an insulator such as of magnesium oxide or aluminum oxide. The outer tube has a tip end closed by a metallic material and has a base end closed by a seal such as of glass or a resin. By isolating the interior of the outer tube from the outside, the pair of thermocouple wires are prevented from being oxidized by oxygen or the like.

SUMMARY

An aspect of the present disclosure resides in a temperature sensor including:
a pair of thermocouple wires;
a temperature measuring junction;
an outer tube;
an insulator; and
a glass seal, wherein
the pair of thermocouple wires disposed in the outer tube have surfaces where passive films are respectively formed due to oxidization of the metallic materials on the surfaces of the pair of thermocouple wires.

It should be noted that the bracketed reference signs designated to the components in an aspect and another aspect of the present disclosure indicate correspondency with the reference signs in the drawings referred to in the embodiment, and do not limit the components only to the content of the embodiment.

BRIEF DESCRIPTION OF THE DRAWINGS

The aims, characteristics or advantages of the present disclosure will be clarified more in the following description specifically explained referring to the accompanying drawings. Drawings of the present disclosure are as follows.

DETAILED DESCRIPTION OF THE PREFERRED EMBODIMENTS

Figure 1:
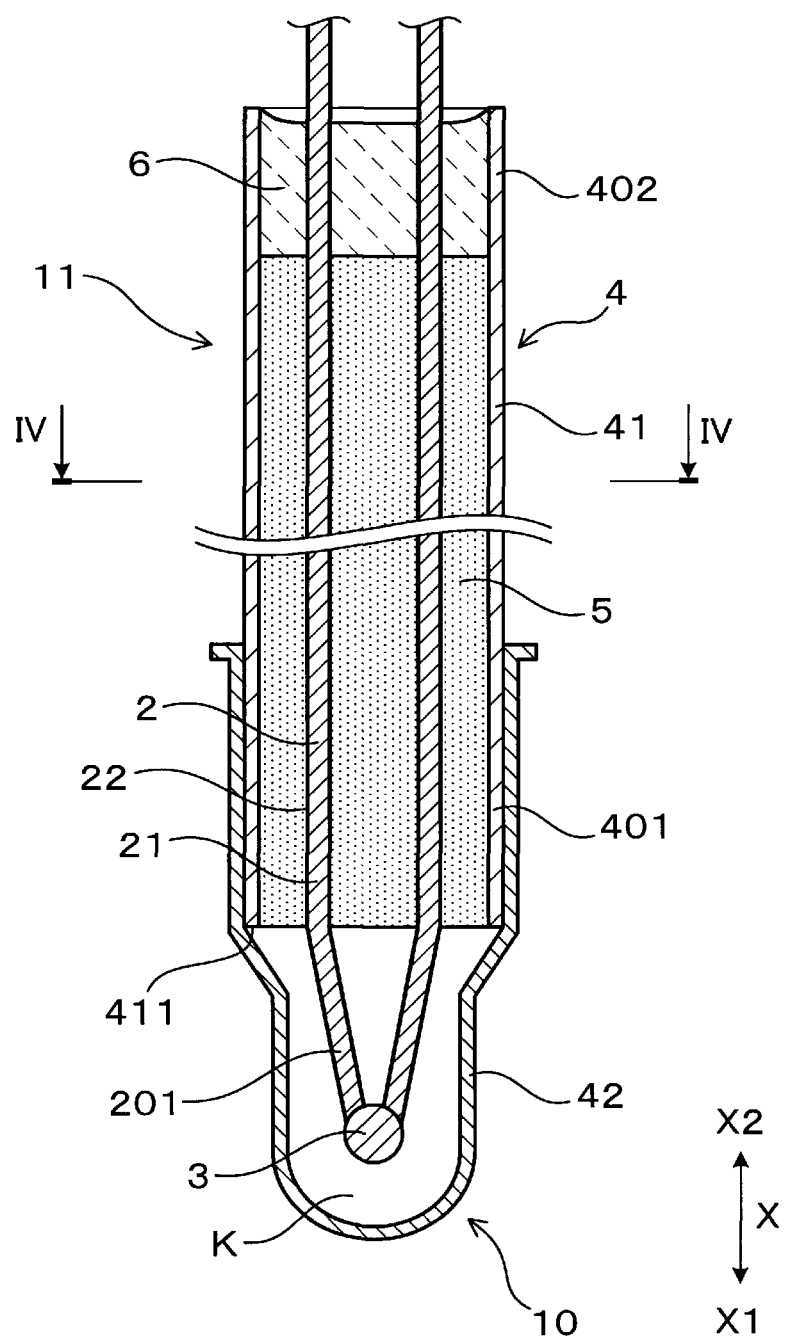
FIG. 1 is a cross-sectional view illustrating a main part of a temperature sensor according to an embodiment.

The inventor of the present disclosure has studied a temperature sensor which ensures less occurrence of errors in output temperature, and a temperature measuring device.

For example, JP 2016-211855 A discloses a sheathed thermocouple in which the tip ends of a pair of thermocouple wires and a temperature measuring junction are coated with an electrically conductive material having high hardness. Discharge coating of these components ensures that there is less heat input to the tip ends of the thermocouple wires and there is less change in temperature measurement characteristics of the thermocouple wires.

In the sheathed thermocouples of temperature sensors of conventional art or of JP 2016-211855 A, the outer tube is sealed by a sealing member to prevent entry of oxygen or the like into the outer tube from outside. However, oxygen in the air may enter the outer tube in the process of producing temperature sensors. The oxygen that has entered the outer tube may gradually oxidize the metallic materials on the surfaces of the thermocouple wires during use of the temperature sensor.

Thus, by the time passive films (oxide films) are formed on the surfaces of the thermocouple wires due to oxidization, the material compositions of the thermocouple wires may have changed. This is because, the materials forming the thermocouple wires are used for forming the passive films. Therefore, when measuring temperature with such a temperature sensor, the electromotive force generated in the thermocouple wires may have an error and thus the output temperature measured by the temperature sensor may be in error.

The coating disclosed in JP 2016-211855 A is formed only on the tip ends of the thermocouple wires and the temperature measuring junction and not formed on portions other than the tip ends of the thermocouple wires in the outer tube. Therefore, in JP 2016-211855 A, portions other than the tip ends of the thermocouple wires in the outer tube may be oxidized due to the oxygen that has entered the outer tube.

The present disclosure has been made to provide a temperature sensor which ensures less occurrence of errors in output temperature, and a temperature measuring device.

A first aspect of the present disclosure resides in a temperature sensor including:

a pair of thermocouple wires made of respective metallic materials different from each other;

a temperature measuring junction formed by joining tip ends of the pair of thermocouple wires together;

an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom;

an insulator made of an insulating material and disposed in the outer tube to insulate the pair of thermocouple wires from the outer tube and fix the pair of thermocouple wires to the outer tube; and a glass seal made of a glass material and filled in at least either of the base end of the outer tube and a holder mounted to the base end of the outer tube to seal the outer tube, wherein the pair of thermocouple wires disposed in the outer tube have surfaces where passive films are respectively formed due to oxidization of the metallic materials on the surfaces of the pair of thermocouple wires.

A second aspect of the present disclosure resides in a temperature measuring device including a temperature sensor and a control unit electrically connected to the temperature sensor and used for temperature measurement performed by the temperature sensor, wherein:

the temperature sensor includes:

a pair of thermocouple wires made of respective metallic materials different from each other, a temperature measuring junction formed by joining tip ends of the pair of thermocouple wires together, an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom, an insulator made of an insulating material and disposed in the outer tube to insulate the pair of thermocouple wires from the outer tube and fix the pair of thermocouple wires to the outer tube, and a glass seal made of a glass material and filled in at least either of the base end of the outer tube and a holder mounted to the base end of the outer tube to seal the outer tube;

the pair of thermocouple wires disposed in the outer tube have surfaces where passive films are respectively formed due to oxidization of the metallic materials on the surfaces of the pair of thermocouple wires; and the control unit is configured to calculate an output temperature for the temperature sensor based on changes in electromotive force generated in the pair of thermocouple wires and correct an error occurring in the output temperature due to the passive films being formed.

In the temperature sensor according to the first aspect, passive films are deliberately formed on the surfaces of a pair of thermocouple wires so that further passive films are less likely to be formed on the surfaces of the pair of thermocouple wires during use of the temperature sensor. Specifically, when producing the temperature sensor, the metallic materials on the surfaces of the pair of thermocouple wires are deliberately oxidized to form passive films on the surfaces of the pair of thermocouple wires. In the state where the temperature sensor has been produced, the pair of thermocouple wires on which the passive films have been formed are held in the outer tube and isolated from the outside.

Thus, even when oxygen has been introduced in the outer tube at the time of using the temperature sensor, the presence of the passive films prevents further oxidization of the pair of thermocouple wires by the oxygen. Therefore, the pair of thermocouple wires is prevented from suffering further changes in their material compositions during use of the temperature sensor. As a result, errors are less likely to occur in the electromotive force generated in the pair of thermocouple wires during use of the temperature sensor.

Accordingly, in the temperature sensor according to an aspect set forth above, errors are less likely to occur in the output temperature measured by the temperature sensor.

The temperature measuring device according to the second aspect includes the control unit which is used for temperature measurement performed by the temperature sensor. The control unit is configured to calculate an output temperature for the temperature sensor based on changes in electromotive force generated in the pair of thermocouple wires during use of the temperature sensor. The control unit is used for the temperature sensor having the pair of thermocouple wires on which the passive films are respectively formed. The control unit is configured to correct an error occurring in the output temperature due to the passive films being formed.

Thus, the control unit can calculate an output temperature for the temperature sensor, considering errors that may occur in the electromotive force of the pair of thermocouple wires due to the formation of the passive films. Accordingly, in the temperature measuring device according to the second aspect, errors are less likely to occur in the output temperature measured by the temperature sensor, and the output temperature can be more accurately calculated for the temperature sensor.

Referring to the drawings, preferred embodiments of the temperature sensor and the temperature measuring device set forth above will be described.

Embodiments

Figure 2:
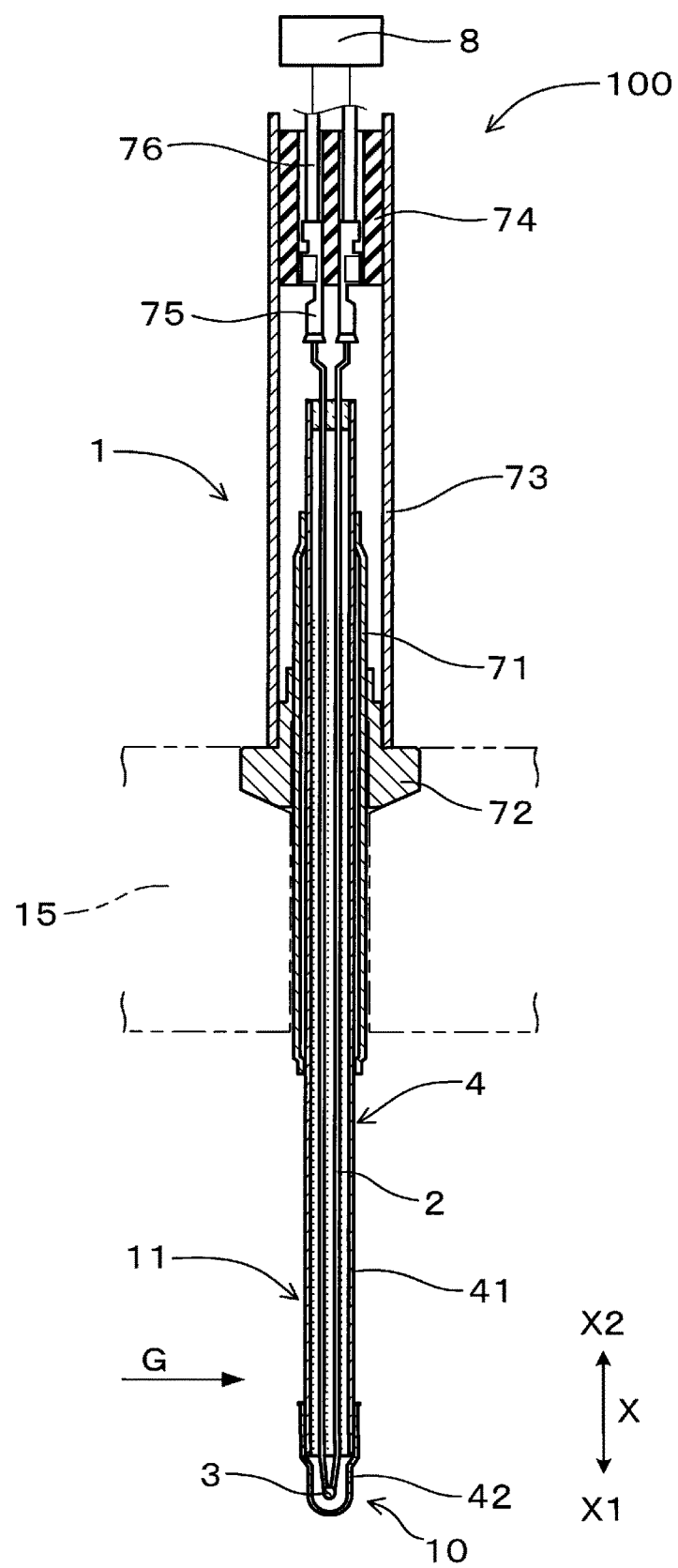
FIG. 2 is a cross-sectional view illustrating a temperature sensor according to an embodiment.

FIGS. 1 and 2 show a temperature sensor 1 of the present embodiment including a pair of thermocouple wires 2, a temperature measuring junction 3, an outer tube 4, a tip end cover 42, an insulator 5 and a glass seal 6. The pair of thermocouple wires 2 are made of respective metallic materials different from each other. The temperature measuring junction 3 is formed by joining the tip ends of the pair of thermocouple wires 2 together. The outer tube 4, which is made of a metallic material, has a tip end 401 to which the tip end cover 42 is mounted to hold the temperature measuring junction 3 therein, and a base end 402 allowing the pair of thermocouple wires 2 to protrude therefrom. The tip end cover 42 is mounted to a tip end outer periphery of the outer tube 4 and closes the outer tube 4 on a tip end side X1.

Figure 3:
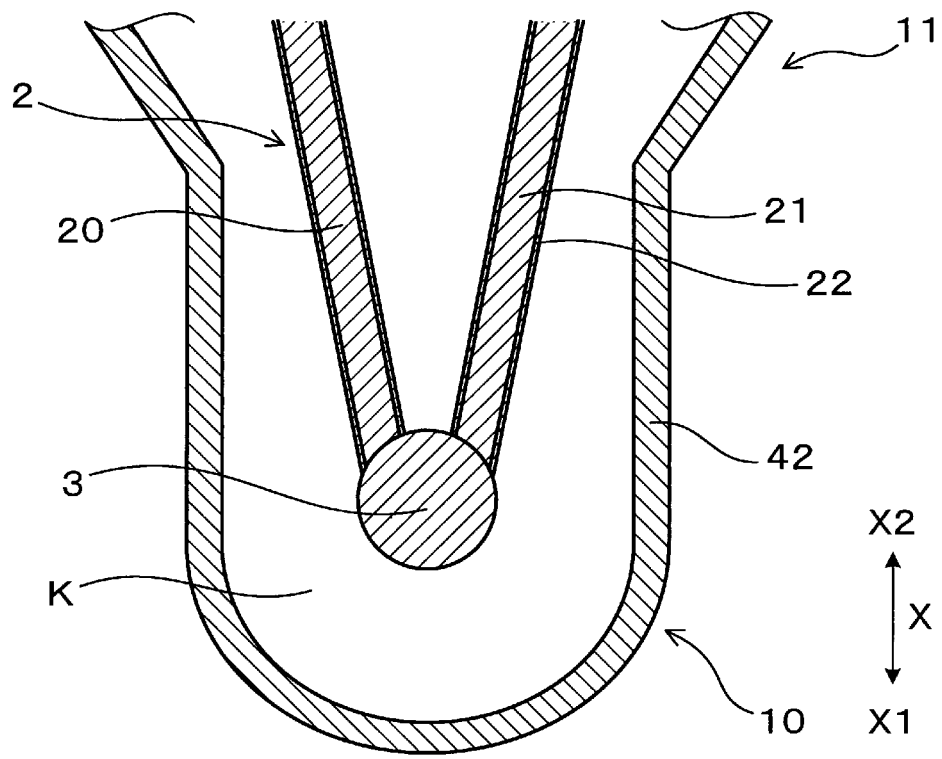
FIG. 3 is a cross-sectional view illustrating a portion near a temperature measuring junction, according to an embodiment.

The insulator 5, which is made of an insulating material, is disposed inside the outer tube 4 to insulate the pair of thermocouple wires 2 from the outer tube 4 and fix the pair of thermocouple wires 2 to the outer tube 4. The glass seal 6, which is made of a glass material, is filled in the base end 402 of the outer tube 4 to seal the outer tube 4 from inside thereof. As shown in FIG. 3, passive films 22 are formed on the respective surfaces of the pair of thermocouple wires 2 disposed in the outer tube 4, due to oxidation of the metallic materials on the surfaces of the thermocouple wires 2.

FIG. 2 shows a temperature measuring device 100 according to the present embodiment, which includes, in addition to the temperature sensor 1, a control unit 8 electrically connected to the temperature sensor 1 and used for temperature measurement performed by the temperature sensor 1. The control unit 8 is configured to calculate an output temperature for the temperature sensor 1 based on changes in electromotive force generated in the pair of thermocouple wires 2 and correct an error occurring in the output temperature due to the passive films 22 being formed.

As shown in FIGS. 1 and 2, the tip end side X1 of the temperature sensor 1 of the present embodiment refers to a side where the temperature measuring junction 3 is provided in the outer tube 4 in an axial direction X along the center axis of the outer tube 4. The base end side X2 refers to an opposite side of the tip end side X1 in the axial direction X.

The temperature sensor 1 and the temperature measuring device 100 of the present embodiment will be described below.
(Temperature Sensor 1)

FIG. 2 shows a temperature sensor 1 for use in vehicles to measure the temperature of a fluid flowing through an intake pipe or an exhaust pipe of an internal combustion engine of the vehicle. The temperature sensor 1 of the present embodiment is disposed in an exhaust pipe 15 and used for measuring the temperature of exhaust gas, as a measurement target gas G under a measurement environment flowing through the exhaust pipe 15. The temperature of the exhaust gas is used by the control unit (electronic control unit) 8 when controlling the combustion of the internal combustion engine. For example, the temperature of the exhaust gas can be used for detecting the temperature of an exhaust purification catalyst disposed in the exhaust pipe. For example, the temperature sensor 1 can be disposed in an intake pipe of an exhaust recirculation passage in which the exhaust gas in the exhaust pipe is recirculated to the intake pipe.

Figure 4:
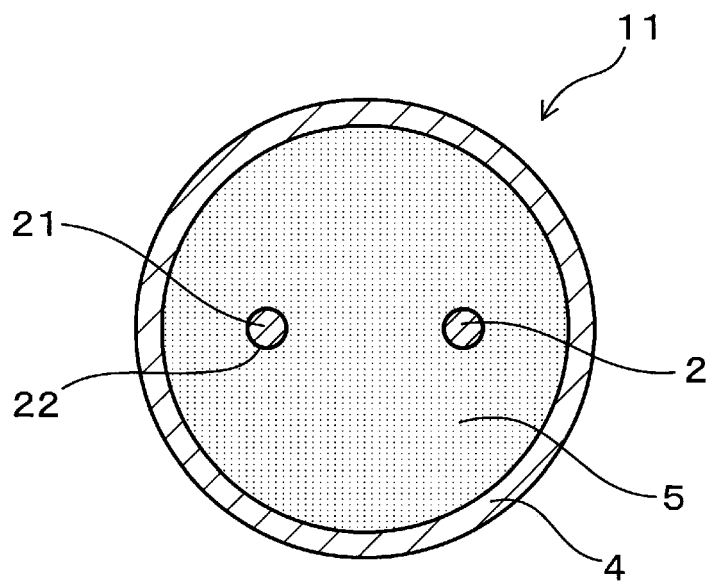
FIG. 4 is a cross-sectional view taken along the line Iv-Iv of FIG. 1.
Figure 12:
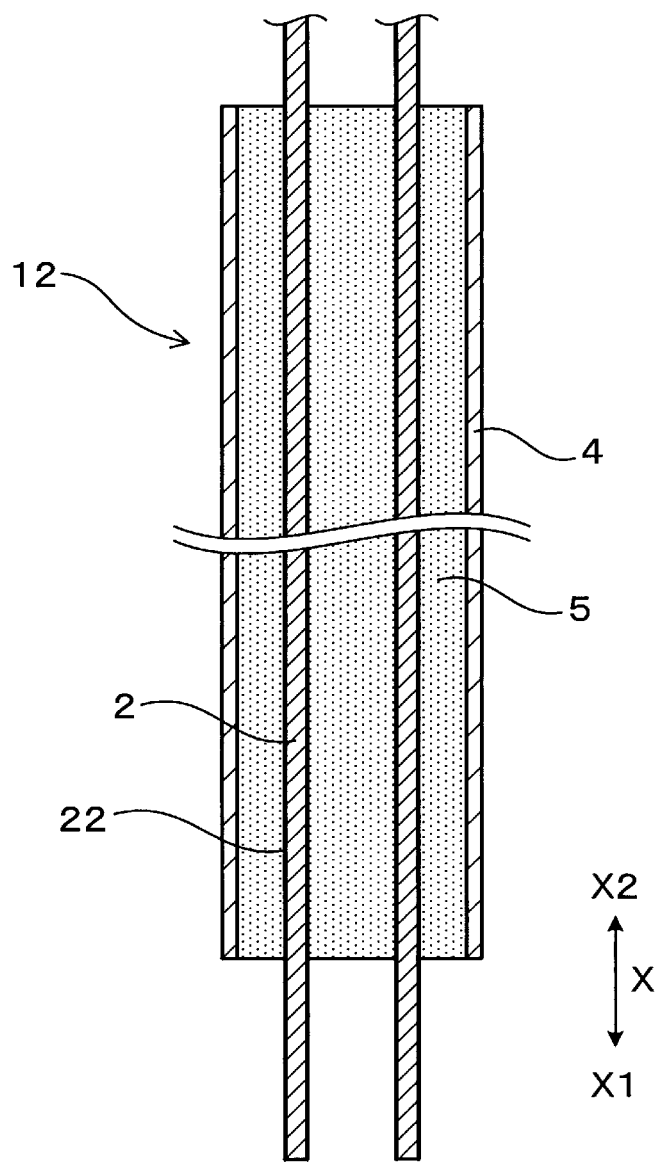
FIG. 12 is a diagram illustrating a sheathed pin used in a process of preparing a sheathed thermocouple, according to an embodiment.

As shown in FIG. 12, the pair of thermocouple wires 2, the outer tube 4 and the insulator 5 used in the present embodiment are integrally formed as a sheathed pin 12. The temperature sensor 1 has a main part which is formed as a sheathed thermocouple 11 including the pair of thermocouple wires 2, the temperature measuring junction 3, the outer tube 4, the insulator 5 and the glass seal 6. FIG. 4 shows a cross section perpendicular to the axial direction X of the sheathed thermocouple 11 and the sheathed pin 12.

As shown in FIG. 2, the temperature sensor 1 also includes a first housing 71 and a second housing 72, which both hold the sheathed thermocouple 11 on the inside, a base end-side cover 73 mounted to the second housing 72, and a bush 74 held inside the base end-side cover 73. The first housing 71 is mounted to the outer periphery of the outer tube 4, while the second housing 72 is mounted to the outer periphery of the first housing 71. The second housing 72 is mounted to a mounting hole provided to an exhaust pipe 15. The bush 74 holds a terminal bracket 75 connected to the pair of thermocouple wires 2.
(Outer Tube 4)

Figure 5:
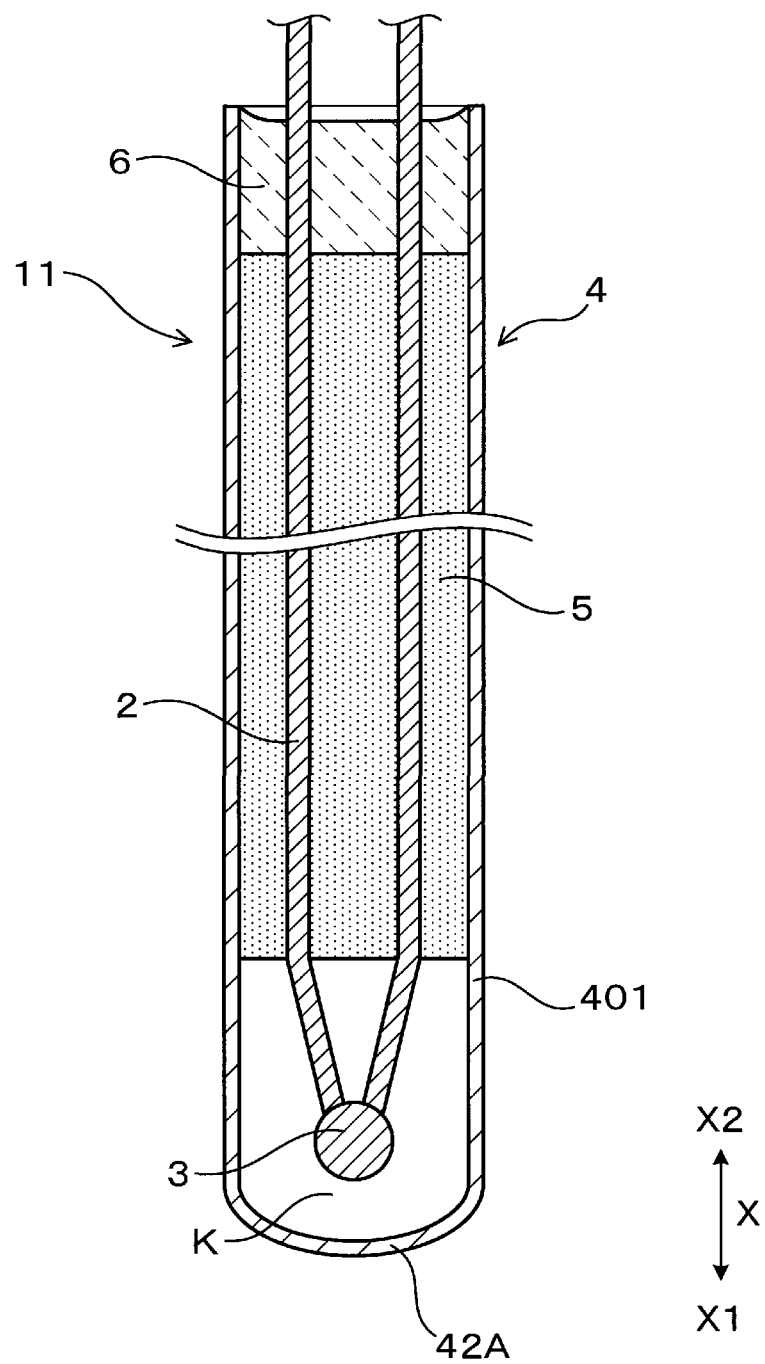
FIG. 5 is a cross-sectional view illustrating a main part of another temperature sensor according to an embodiment.

The outer tube 4, which is also referred to as a sheathing tube or a metal sheath, is made of a metallic material, such as stainless steel (SUS or NCA) or a Ni-based heat-resistant alloy (NCF). As shown in FIG. 12, the outer tube 4 makes use of the outer tube of the sheathed pin 12 having a cylindrical shape. The tip end 401 of the outer tube 4 is closed by a metallic material. As shown in FIG. 1, the tip end 401, i.e., the tip end of a cylindrical part 41 of the outer tube 4, of the present embodiment is closed by the tip end cover 42 mounted to the outer periphery of the tip end 401. As shown in FIG. 5, the tip end 401 of the outer tube 4 may be closed by a cover 42A which is continuously formed from the tip end 401 of the cylindrical part 41. The cover 42A may be formed of a piece of metal welded to the tip end of the cylindrical part 41 of the outer tube 4.

Figure 6:
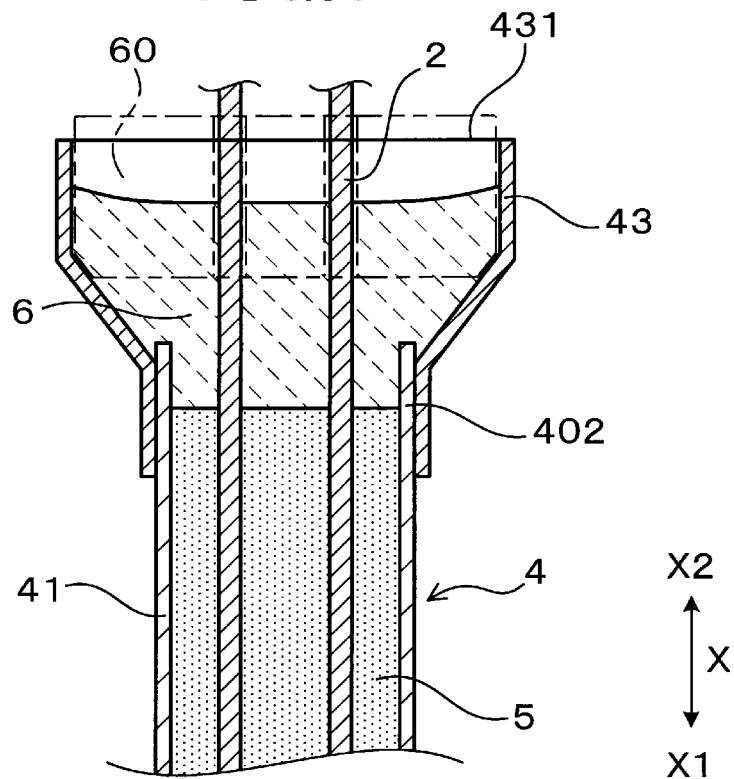
FIG. 6 is a cross-sectional view illustrating a portion near a base end of another outer tube, according to an embodiment.

As shown in FIG. 6, a holder 43 for placing a tablet 60 for the glass seal 6 may be mounted to the base end 402 of the outer tube 4. The holder 43 has a funnel shape and has an upper opening 431 with an inner diameter larger than the outer diameter of the outer tube 4. The holder 43 is used for filling a glass material, i.e., a melted tablet 60, in the base end 402 of the outer tube 4. The holder 43 may be press-fitted to the outer periphery of the base end 402 of the outer tube 4, or may be crimped and fixed to or welded to the outer periphery of the base end 402 of the outer tube 4.

The size of the tablet 60 placed in the holder 43 may be larger than the size thereof in the case of being placed in the base end 402 of the outer tube 4. When the tablet 60 placed in the holder 43 is melted as a glass material, the glass material can flow into the base end 402 of the outer tube 4 from inside the holder 43. Thus, a large amount of the glass material can be melted and the glass material can be sufficiently supplied to the base end 402 of the outer tube 4. Accordingly, the outer tube 4 can be more effectively sealed from inside thereof by the glass seal 6.

Figure 7:
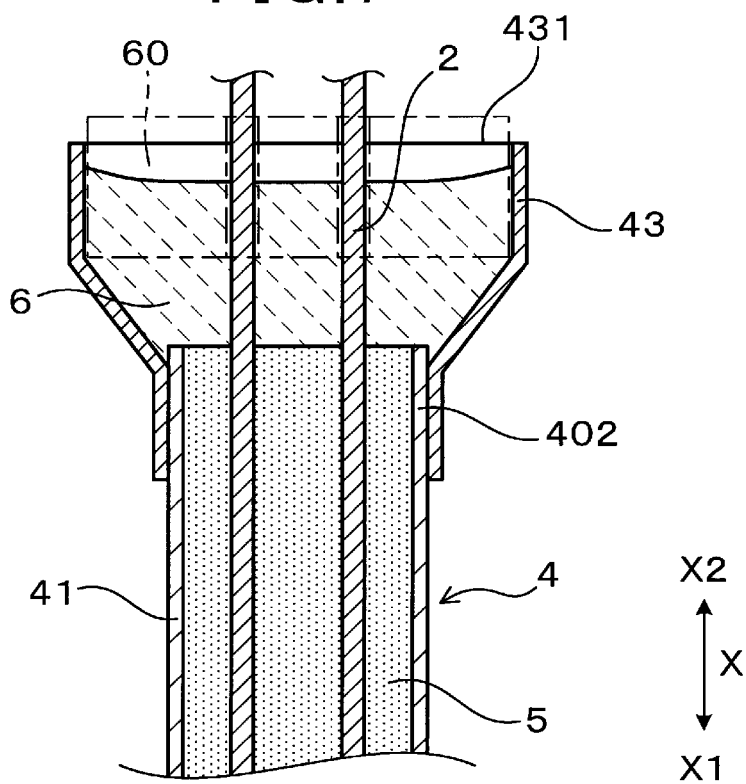
FIG. 7 is a cross-sectional view illustrating a portion near a base end of another outer tube, according to an embodiment.

As shown in FIG. 7, when the holder 43 is used, the glass seal 6 may be filled in the holder 43 to seal the base end 402 of the outer tube 4. In this case, the inner diameter of the holder 43 may be larger than that of the outer tube 4. By filling the holder 43 with the glass seal 6, a higher compression effect can be exerted and higher airtightness can be secured in the outer tube 4. Also, in this case, the time of scraping part of the insulator 5 from the base end of the sheathed pin 12 (the base end 402 of the sheathed tube 4) can be saved. It is more preferred that the glass seal 6 is filled in the holder 43 up to the level of the maximum diameter thereof. In this case, even higher compression effect can be exerted and even higher air tightness can be effectively secured in the outer tube 4.

(Pair of Thermocouple Wires 2)

The pair of thermocouple wires 2 are made of respective metallic materials different from each other so that the Seebeck effect can be exerted. The pair of thermocouple wires 2 of the preset embodiment form an N-type thermocouple (sheathed thermocouple 11). With this configuration, the temperature measurement range of the temperature sensor 1 can be easily increased. The temperature sensor 1 of the present embodiment can measure the temperature of a measurement target gas G having a temperature of 1,000° C. or more. The thermocouple wires 2 have a positive leg made of nicrosil which is an alloy comprising Ni (nickel), Cr (chromium) and Si (silicon) as main components. The thermocouple wires 2 have a negative leg made of nisil which is an alloy comprising Ni (nickel) and Si (silicon) as main components.

The pair of thermocouple wires 2 each have a diameter in the range of ϕ0.01 mm to ϕ2.0 mm. The diameters of the pair of thermocouple wires 2 of the present embodiment are equal to each other. The diameter may be different between the positive and negative legs of the thermocouple wires 2. It is difficult reduce the diameters of the thermocouple wires 2 to less than ϕ0.01 mm from the perspective of production and strength. If the diameters of the thermocouple wires 2 are larger than ϕ2.0 mm, the size of the sheathed thermocouple 11 increases, by which the responsiveness, mountability and the like of the temperature sensor 1 may be adversely affected.

As shown in FIGS. 1 and 3, the pair of thermocouple wires 2 of the present embodiment have surfaces on which passive films 22 are respectively formed. The passive films 22 are formed by oxidization of the electrically conductive metallic materials forming the respective thermocouple wires 2. The passive films 22 serve as protective films which prevent the metallic materials from contacting oxygen and being oxidized. The pair of thermocouple wires 2 have conductive portions 21 of metallic materials having electrical conductivity, on the inside of the respective passive films 22.

The passive film 22 formed on the surface of the positive leg of the thermocouple wires 2 of the present embodiment comprises Cr oxide or Ni oxide which is formed by oxidization of Cr or Ni in the metallic material and which is contained in the largest amount. With this configuration, a passive film 22 with a required thickness can be easily formed. The expression "contained in the largest amount" refers to the content of the Cr oxide or Ni oxide being the highest among the oxides forming the passive film. The passive film 22 of the positive leg of the thermocouple wires 2 may comprise an oxide, such as Si oxide, other than the Cr oxide or Ni oxide. Alternatively, substantially the entire passive film 22 of the positive leg of the thermocouple wires 2 may be formed of the Cr oxide or Ni oxide.

The passive film 22 formed on the surface of the negative leg of the thermocouple wires 2 of the present embodiment comprises Ni oxide which is formed by oxidization of Ni in the metallic material and which is contained in the largest amount. With this configuration, a passive film 22 with a required thickness can be easily formed. The expression "contained in the largest amount" refers to the content of the Ni oxide being the highest among the oxides forming the passive film. The passive film 22 of the negative leg of the thermocouple wires 2 may comprise an oxide, such as Si oxide, other than the Ni oxide. Alternatively, substantially the entire passive film 22 of the negative leg of the thermocouple wires 2 may be formed of the Ni oxide.

The passive films 22 of the present embodiment are formed by oxidization of the surfaces of the pair of thermocouple wires 2 before the outer tube 4 is sealed from inside thereof by the glass seal 6. With this configuration, the passive films 22 can be easily formed. The passive films 22 are formed by thermally processing the pair of thermocouple wires 2 which are integral with the outer tube 4 and the insulator 5 as a sheathed pin 12. In the insulator 5 sealed in the outer tube 4 of the temperature sensor 1, gaps are formed between the powder particles, through which oxygen (air) can contact the pair of thermocouple wires 2.

The passive films 22 of the thermocouple wires 2 of the present embodiment each have a thickness in the range of 0.3 μm to 10 μm. The passive films 22 of the present embodiment are formed all across surfaces of the pair of thermocouple wires 2. When the passive films 22 each have a thickness in the range of 0.3 μm to 10 μm, the films are less likely to grow more and less likely to separate. The passive films 22 do not necessarily have to be formed with an even thickness all across the thermocouple wires 2. The passive films 22 may each have a thickness different between portions of the thermocouple wires 2. However, in this case as well, the thicknesses of the passive films 22 in portions of the thermocouple wires 2 in the outer tube 4 are preferred to be in the range of 0.3 μm to 10 μm.

If the passive films 22 each have a thickness of less than 0.3 μm, oxidization of the metallic materials forming the thermocouple wires 2 may progress during use of the temperature sensor 1 and the thickness may tend to increase. In this case, there is also a concern that the thermocouple wires 2 are likely to have portions where almost no passive films 22 are formed. If the passive films 22 each have a thickness exceeding 10 μm, the passive films 22 may separate during use of the temperature sensor 1.

It should be noted that the pair of thermocouple wires 2 may form various types of thermocouples other than N type. For example, the pair of thermocouple wires 2 may form a K type thermocouple having a positive leg made of chromel which is an alloy comprising Ni and Cr as main components, and a negative leg made of alumel which is an alloy comprising Ni, Al and Si as main components. In this case, Cr oxide or Ni oxide may be formed on the positive leg of the thermocouple wires 2. Also, Al oxide, Si oxide or Ni oxide may be formed on the negative leg of the thermocouple wires 2.

As shown in FIG. 2, the pair of thermocouple wires 2 are inserted into the outer tube 4 so as to be parallel to each other. The pair of thermocouple wires 2 are drawn out from the outer tube 4 toward the base end side X2 and connected to the external control unit 8 via the terminal bracket 75 and leads 76 provided to the temperature sensor 1. The control unit 8 may be a sensor control unit (SCU) which is connected to an engine control unit (ECU). The control unit 8 may be formulated as an engine control unit.

(Temperature Measuring Junction 3)

As shown in FIG. 2, the temperature measuring junction 3, which is also referred to as a hot junction, is formed into a spherical shape by fusing the metallic material forming the positive leg of the pair of thermocouple wires 2 with the metallic material forming the negative leg thereof. The temperature sensor 1 has a temperature measuring tip end 10 which includes the temperature measuring junction 3 and the tip end cover 42 enclosing the temperature measuring junction 3. The pair of thermocouple wires 2 of the temperature sensor 1 are connected to an amplifier in the control unit 8 via the terminal bracket 75, the leads 76 and the like to form a circuit for measuring temperature. A reference junction located opposite to the temperature measuring junction 3 in the pair of thermocouple wires 2 is formed in the control unit 8. The temperature difference between the temperature measuring junction 3 and the reference junction generates an electromotive force in the pair of thermocouple wires 2.

Figure 8:
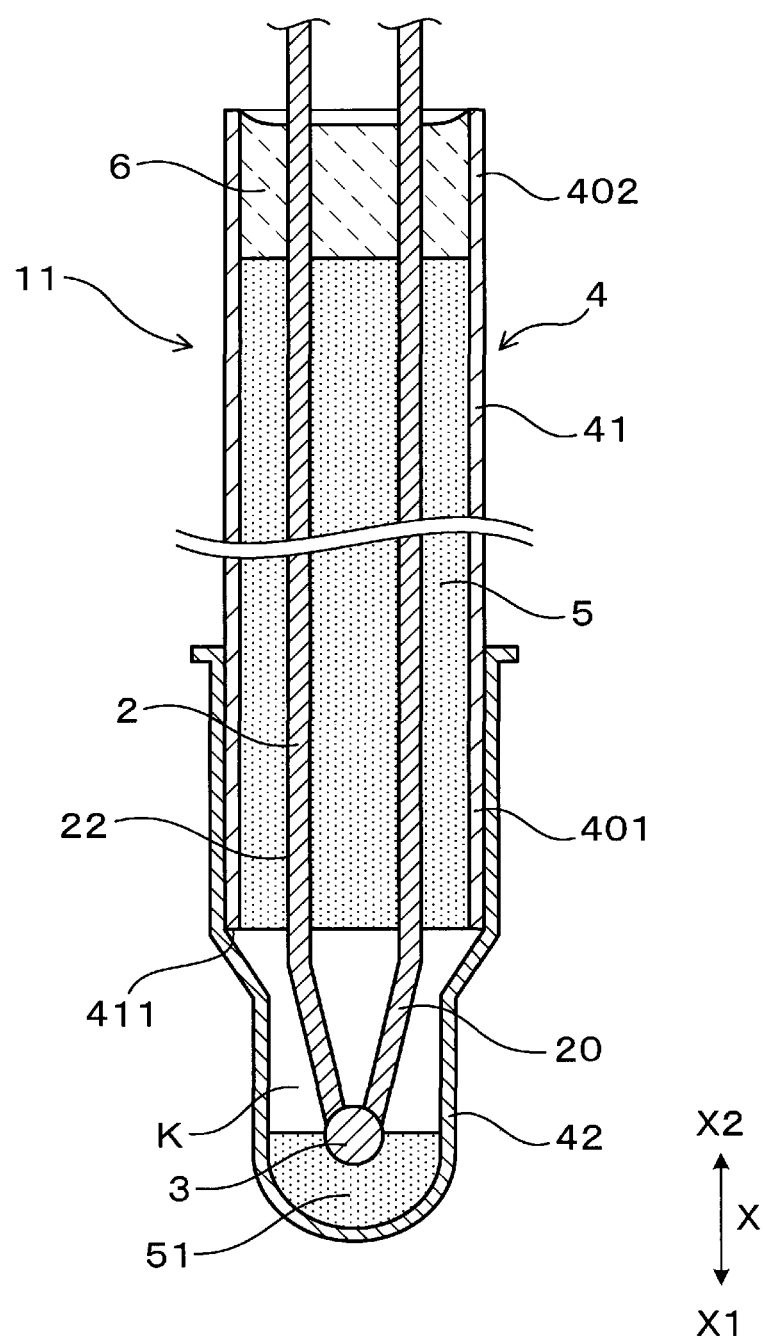
FIG. 8 is a cross-sectional view illustrating a main part of another temperature sensor according to an embodiment.

As shown in FIG. 1, the temperature measuring junction 3 of the present embodiment is disposed in a gas phase K in the tip end cover 42 which is mounted to the tip end 401 of the outer tube 4. As shown in FIG. 8, the temperature measuring junction 3 may be fixed to the tip end cover 42 via a filler 51 disposed inside the tip end cover 42. The filler 51 is made of an insulating metal oxide. Tip ends 201 of the pair of thermocouple wires 2 and the temperature measuring junction 3 are disposed so as to be protruded toward the tip end side X1 from a tip end opening 411 of the cylindrical part 41 of the outer tube 4.

(Insulator 5)

As shown in FIG. 1, the insulator 5 is made of a powder of a metal oxide, such as magnesium oxide (MgO) or aluminum oxide (A1203). The gap between the inner periphery of the outer tube 4 and the outer peripheries of the pair of thermocouple wires 2 is filled with a powder of the insulator 5. There are gaps formed between the powder particles of the insulator 5. The powder of the insulator 5 has been compressed when forming the sheathed pin 12 to reduce the diameter thereof. The pair of thermocouple wires 2 are held in the outer tube 4 by the powder of the insulator 5.

(Glass Seal 6)

The glass seal 6 is made of Bi-based glass comprising Bi (bismuth), or Pb-based glass comprising Pb (lead). The Bi-based glass comprises $Bi_2O_3$ (bismuth oxide) as a main component, other oxides and the like. Other oxides may include $B_2O_3$, SrO, ZnO and BaO. The Pb-based glass comprises PbO (lead oxide) as a main component, other oxides and the like. Other oxides may include $B_2O_3$, SrO, ZnO and $SiO_2$.

Figure 9:
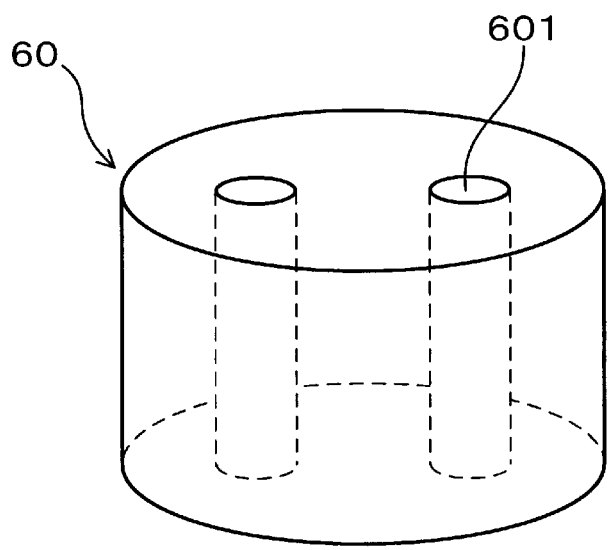
FIG. 9 is a perspective view illustrating a tablet for a glass seal, according to an embodiment.

The glass seal 6 is obtained by melting a solid-state glass tablet 60 and then solidifying the melted tablet 60. When the Bi- or Pb-based glass is used, the tablet 60 can be melted by heating it, for example, to 400° C. to 700° C. As shown in FIG. 9, the tablet 60 has a size suitable for insertion into the base end 402 of the outer tube 4 or the holder 43. The tablet 60 has two insertion holes 601 through which the pair of thermocouple wires 2 can be respectively inserted.

(Control Unit 8)

The control unit 8 has an amplifier used for temperature measurement performed by the temperature sensor 1, and a computer calculating an output temperature for the temperature sensor 1 based on the electromotive force generated in the pair of thermocouple wires 2. The following output temperature and corrected output temperature are calculated by the computer. The change in electromotive force generated in the pair of thermocouple wires 2 is converted to a change in output temperature by the control unit 8. In the control unit 8, a map is formulated, correlating electromotive force with output temperature. In the control unit 8, the temperature of the measurement target gas G measured by the temperature sensor 1 is outputted as an output temperature, according to the magnitude of the electromotive force.

The temperature sensor 1 of the present embodiment includes the pair of thermocouple wires 2 on which the passive films 22 are respectively formed. Therefore, the conductive portions 21 of the pair of thermocouple wires 2 have a cross-sectional area smaller than the cross-sectional area of the conductive portions of generally used temperature sensors in which no passive films 22 are formed on the pair of thermocouple wires 2. Thus, the electromotive force generated in the temperature sensor 1 of the present embodiment is considered to be slightly smaller than the electromotive force generated in the generally used temperature sensors 1.

In the temperature sensor 1 of the present embodiment, the output temperature outputted from the control unit 8 may have an error due to the passive films 22 being formed on the pair of thermocouple wires 2. In this regard, the map formulated in the control unit 8 of the present embodiment is configured such that a corrected output temperature is outputted after correcting an error, which would be caused in the output temperature due to formation of the passive films 22, according to the electromotive force generated in the pair of thermocouple wires 2.

Specifically, the temperature of a gas set to a predetermined inspection temperature is measured using the pair of thermocouple wires 2 on which the passive films 22 are formed to use the difference between the measured output temperature and the inspection temperature as a basis for correction. The output temperature is corrected by changing the map, in which electromotive force is correlated with output temperature, so that there will be no difference between the measured output temperature and the inspection temperature. In other words, the output temperature is corrected by changing the output temperature calculated for the electromotive force.

Figure 10:
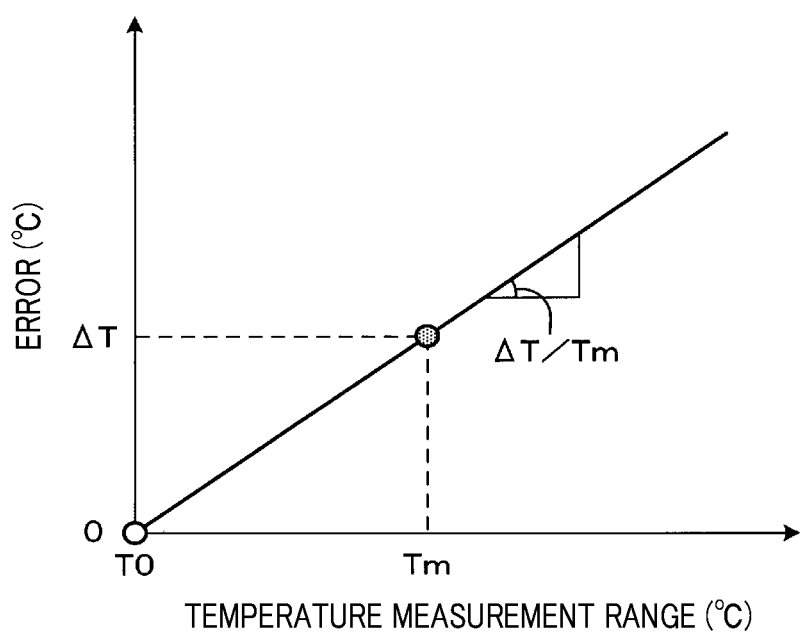
FIG. 10 is a graph illustrating a relationship between measured temperature and error, according to an embodiment.

The output temperature can be corrected by the following linear estimation correction. As shown in FIG. 10, an error ΔT between an inspection temperature Tm and a measured output temperature T1 is calculated. Then, in a graph showing a relationship between measured temperature range (° C.) and error (° C.), a straight line L is drawn passing 0° C., i.e. the temperature of the reference junction as a reference temperature T0 of the temperature sensor 1, and ΔT° C. The straight line L has an inclination ΔT/Tm. A corrected output temperature T2 based on linear estimation correction can be calculated from T2=T1+T1×ΔT/Tm where T1 is an output temperature obtained every time temperature is measured.

An inclination ΔTa/Tmm of the straight line L can also be calculated as follows. Specifically, the inspection temperature Tm is taken to be a plurality of different temperatures and, for each of the plurality of inspection temperatures Tm, an error ΔT between the measured output temperature T1 and the inspection temperature Tm is calculated. Then, the inclination ΔTa/Tm of the straight line L can be calculated using an average ΔTa of the errors ΔT. Alternatively, for a plurality of inspection temperatures Tm, an error ΔT between a measured output temperature T1 and an inspection temperature Tm may be calculated, and the errors ΔT may be subjected to a regression analysis as a straight line passing 0° C. to use the inclination as an inclination of a straight line.

The output temperature T1 may also be corrected by calculating an error ratio α, i.e. by calculating how a measured output temperature T1 differs from an inspection temperature Tm, and multiplying the output temperature T1 by the error ratio a. The error ratio a can be calculated as α=Tm/T1. In this case, a corrected output temperature T2 can be calculated by multiplying a measured output temperature T1 by the error ratio a as T2=T1×α. The error ratio α of an output temperature T1 relative to an inspection temperature Tm may be calculated for a plurality of inspection temperatures Tm, and an average of the error ratios α may be used as an error ratio α.

(Preparation Method)

Referring to the flowchart of FIG. 11, a method of preparing the sheathed thermocouple 11 as a main part of the temperature sensor 1 of the present embodiment will be described.

Figure 11:
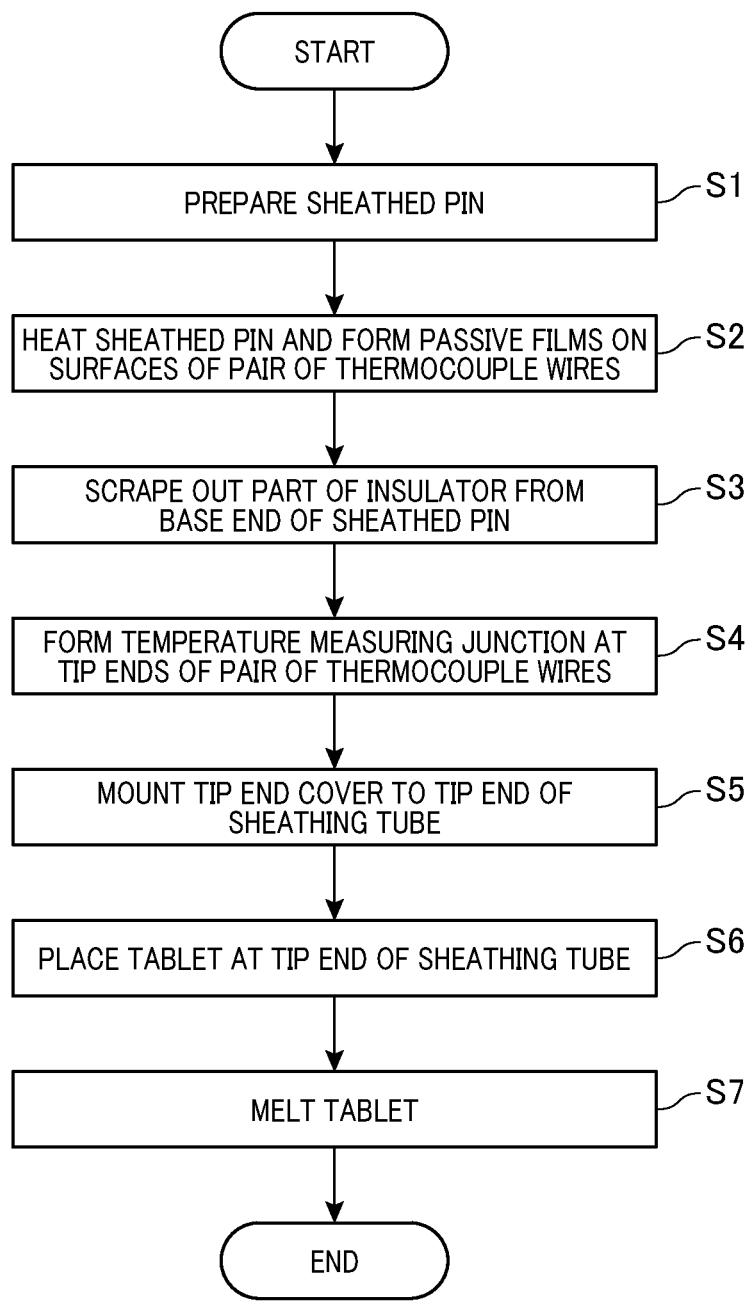
FIG. 11 is a flowchart illustrating a method of preparing a sheathed thermocouple forming a temperature sensor according to an embodiment.

First, a sheathed pin 12 including an outer tube 4 in which a pair of thermocouple wires 2 are held by an insulator 5 is prepared (step S1 of FIG. 11). As shown in FIG. 12, the pair of thermocouple wires 2 are protruded from both the tip end side X1 and the base end side X2 of the sheathed pin 12.

Then, the sheathed pin 12 is heated to 500° C. to 800° C. for an appropriate time in an atmosphere where air is present (step S2). In this case, the air contacts the pair of thermocouple wires 2 via the gaps in the insulator 5 of the sheathed pin 12 and oxidizes the metallic materials on the surfaces of the pair of thermocouple wires 2. Thus, passive films 22 as oxide films are formed on the surfaces of the pair of thermocouple wires 2.

Figure 13:
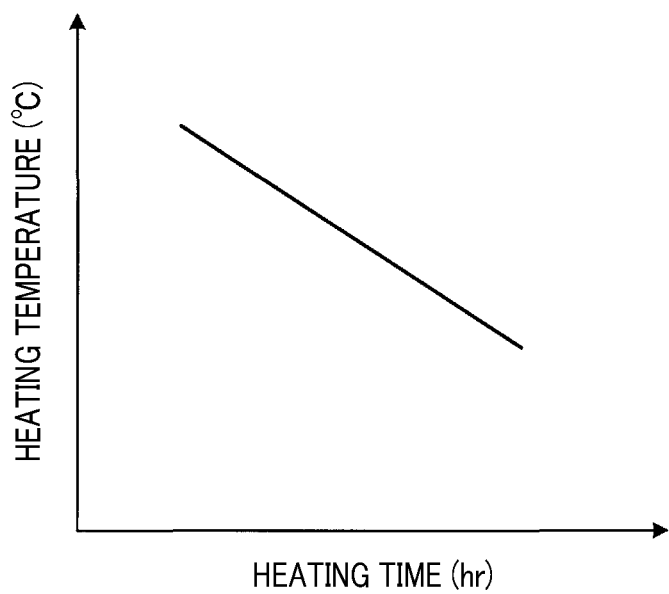
FIG. 13 is a graph illustrating a relationship between heating temperature and heating time, according to an embodiment.

While confirming the thicknesses of the passive films 22 formed on the thermocouple wires 2, heating temperature and heating time of the sheathed pin 12 may be appropriately determined so that the thicknesses will in the range of 0.3 μm to 10 μm. As shown in FIG. 13, heating temperature and heating time have a relationship that higher heating temperature reduces heating time accordingly. For example, heating time may be in the range of 0.5 hours to 50 hours. When the heating temperature is around 800° C., the heating time may be around 0.5 hours. When the heating temperature is around 500° C., the heating time may be around 10 hours.

Figure 14:
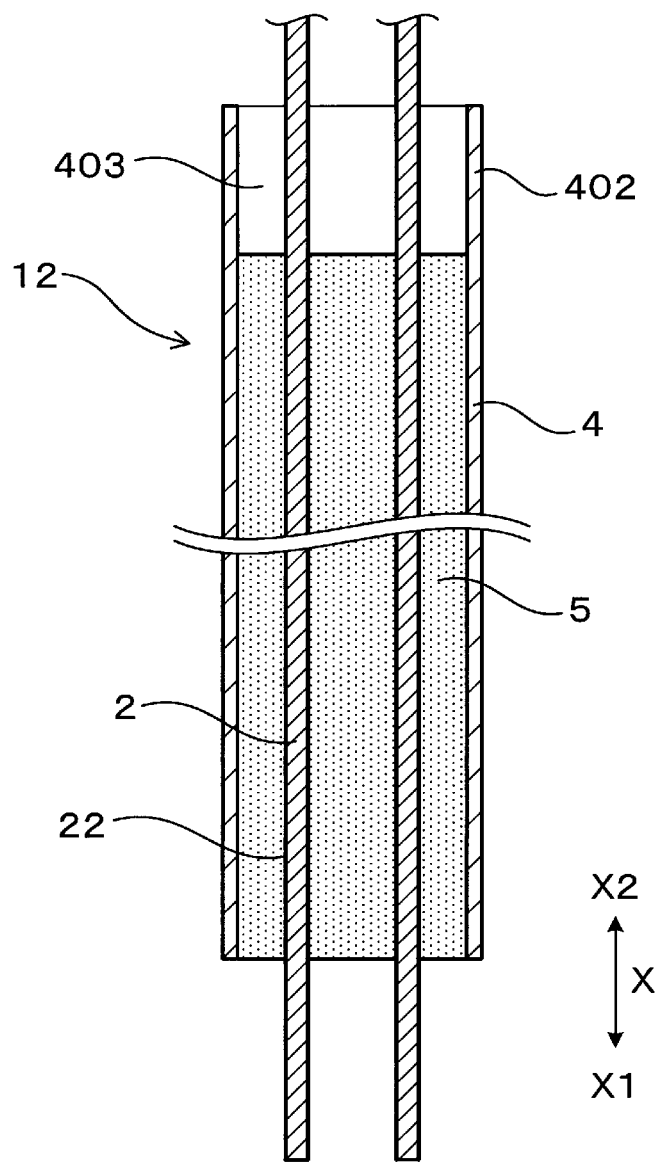
FIG. 14 is a diagram illustrating a state in which part of an insulator has been scraped from the base end of a sheathed pin in a process of preparing a sheathed thermocouple, according to an embodiment.
Figure 15:
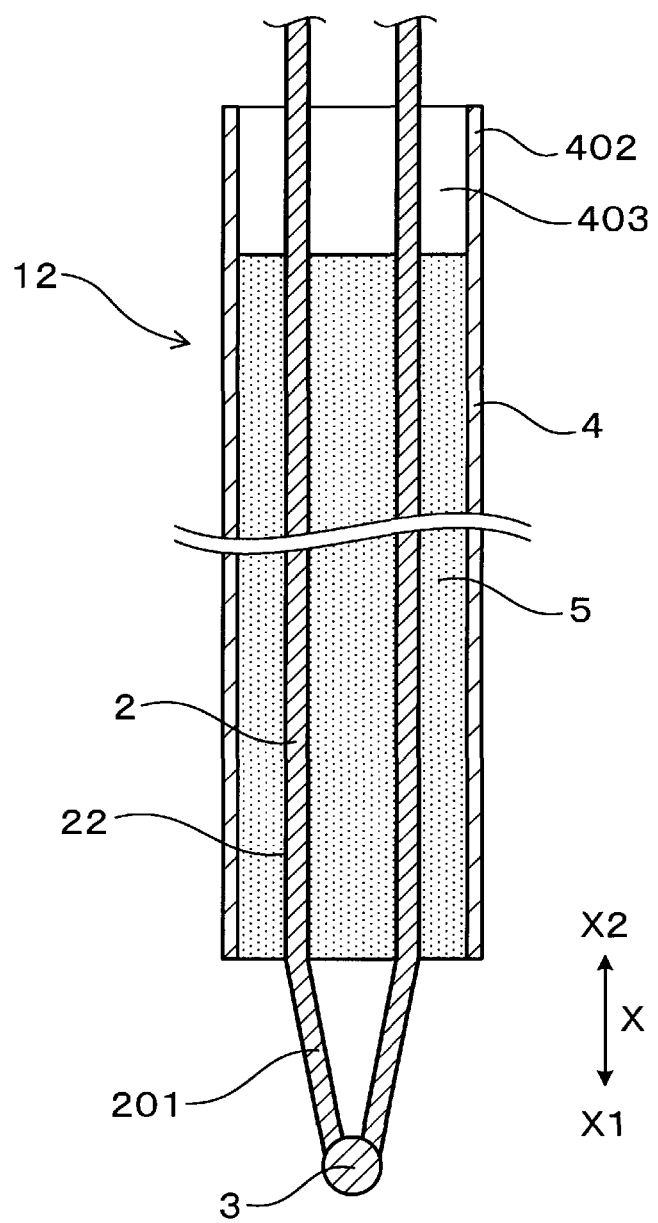
FIG. 15 is a diagram illustrating a state in which a temperature measuring junction has been formed at the tip ends of a pair of thermocouple wires in a process of preparing a sheathed thermocouple, according to an embodiment.

Then, as shown in FIG. 14, in a state in which the pair of thermocouple wires 2 and the outer tube 4 are sustained, part of the insulator 5 is scraped from the base end of the sheathed pin 12 (step S3). In this case, the insulator 5 can be scraped by shot blasting or the like. After scraping the insulator 5, a space 403 is left at the base end 402 of the outer tube 4. Then, as shown in FIG. 15, tip ends 201 of the pair of thermocouple wires 2 protruding from the tip end of the sheathed pin 12 are brought into contact with each other and fused by using a laser or the like, so that the tip ends 201 are joined together to thereby form a temperature measuring junction 3 (step S4).

Figure 16:
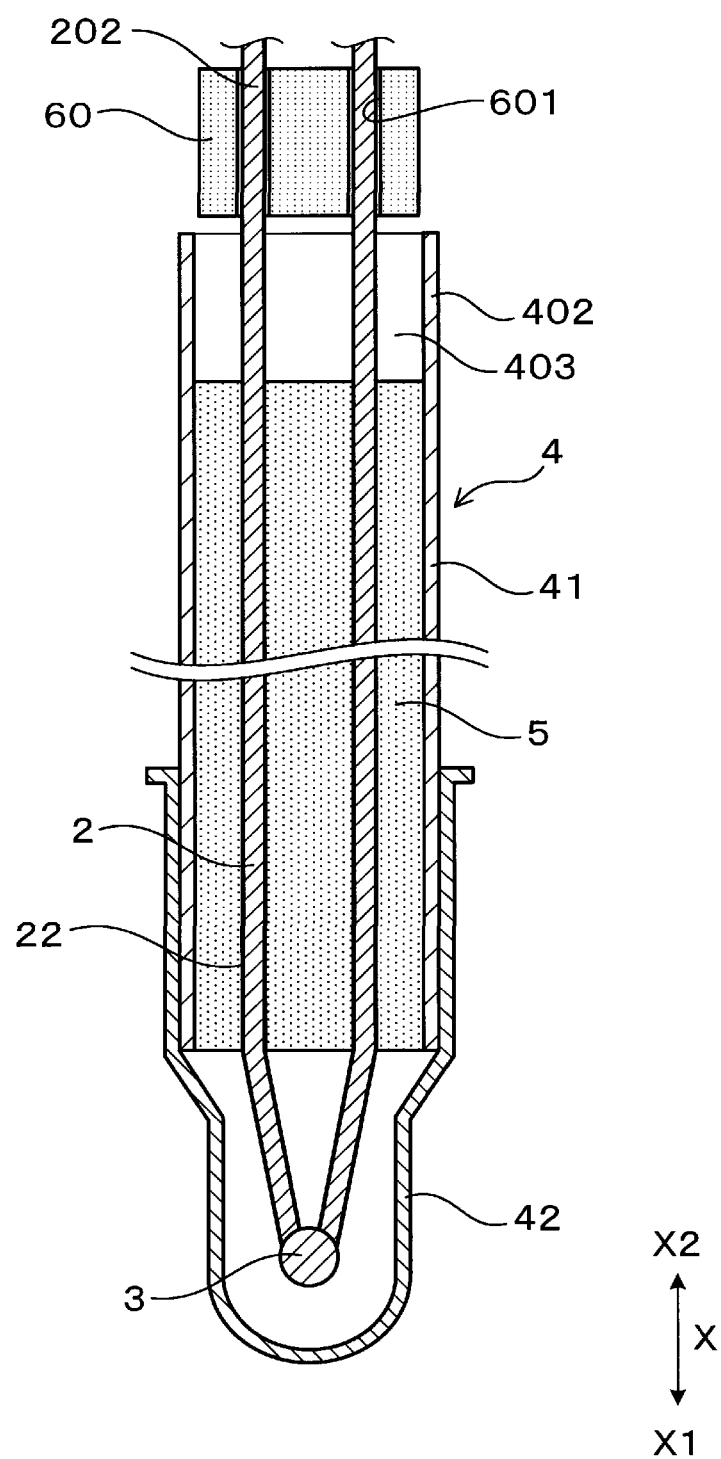
FIG. 16 is a diagram illustrating a state in which a tip end cover has been mounted to the tip end of an outer tube and a tablet has been placed at the base end of the outer tube in a process of preparing a sheathed thermocouple, according to an embodiment.

Then, as shown in FIG. 16, a tip end cover 42 is mounted to the tip end 401 of the outer tube 4 of the sheathed pin 12, fixed to the tip end 401 of the outer tube 4 by welding crimping or the like (step S5). In this case, a filler 51 that is a powdered metal oxide may be disposed inside the tip end cover 42 to fix the temperature measuring junction 3 to the tip end cover 42 (see FIG. 8). It should be noted that steps S3 and S4 may be performed prior to step S2. It should be noted that steps S4 and S5 may be performed prior to step S3.

Then, as shown in the figure, a tablet 60 for forming the glass seal 6 is placed in the space 403 at the base end 402 of the outer tube 4 (step S6). In this case, the base ends 202 of the pair of thermocouple wires 2 protruding from the base end 402 of the outer tube 4 are respectively inserted into through holes 601 of the tablet 60. Then, the base end 402 of the outer tube 4 and the tablet 60 are heated to melt the tablet 60 (step S7).

Then, when heating of the tablet 60 and the like have been completed, the melted tablet 60 is cooled and solidified to form a glass seal 6. Thus, the base end 402 of the outer tube 4 is sealed by the glass seal 6, and the interior of the outer tube 4 is isolated from the outside by the glass seal 6. In this way, a sheathed thermocouple 11 as a main part of the temperature sensor 1 is prepared.

(Passive Films 22)

The sheathed pin 12 is formed by performing diameter-reducing processing stepwise for the outer tube 4 in which the pair of thermocouple wires 2 and the insulator 5 are disposed. The diameter-reducing processing is generally performed in a reducing atmosphere containing almost no oxygen to prevent oxidization of the surfaces of the pair of thermocouple wires 2. For this reason, no passive films 22 are formed on the surfaces of the pair of thermocouple wires 2 in the sheathed thermocouple 11 for generally used temperature sensors 1.

In the temperature sensor 1 of the present embodiment, however, passive films 22 are deliberately formed on the surfaces of the pair of thermocouple wires 2. For this purpose, part of the diameter-reducing processing of the sheathed pin 12 used for the temperature sensor 1 of the present embodiment may be performed in an oxidizing atmosphere containing oxygen, instead of in a reducing atmosphere.

(Another Preparation Method)

Figure 17:
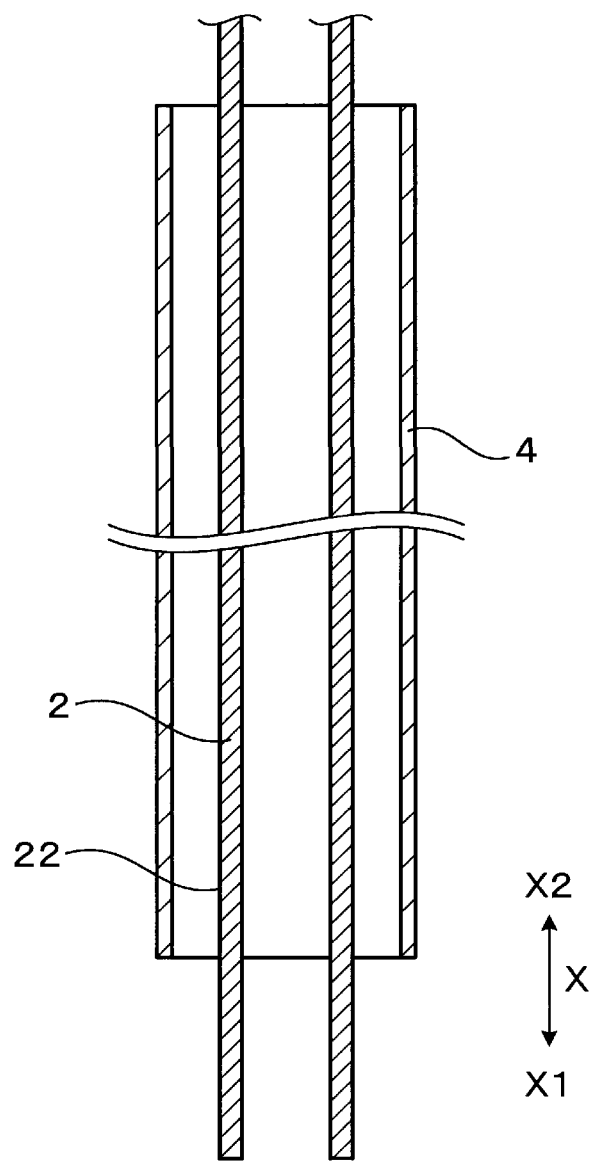
FIG. 17 is a diagram illustrating a state in which a pair of thermocouple wires have been inserted into an outer tube in a process of preparing another thermocouple, according to an embodiment.
Figure 18:
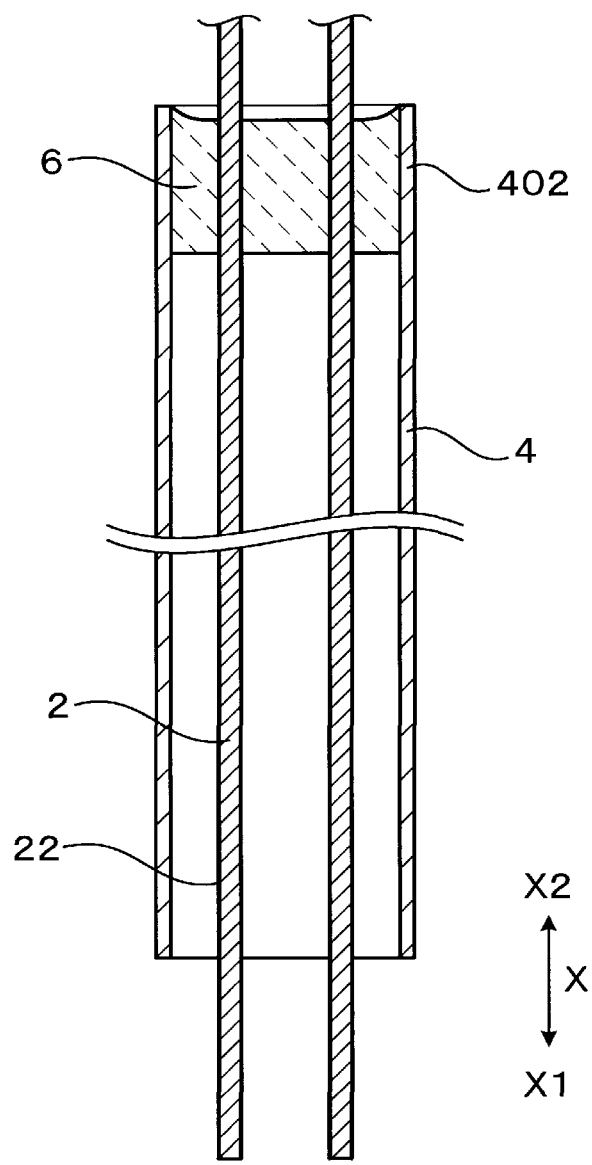
FIG. 18 is a diagram illustrating a state in which a glass seal has been filled in the base end of an outer tube in a process of preparing another thermocouple, according to an embodiment.
Figure 19:
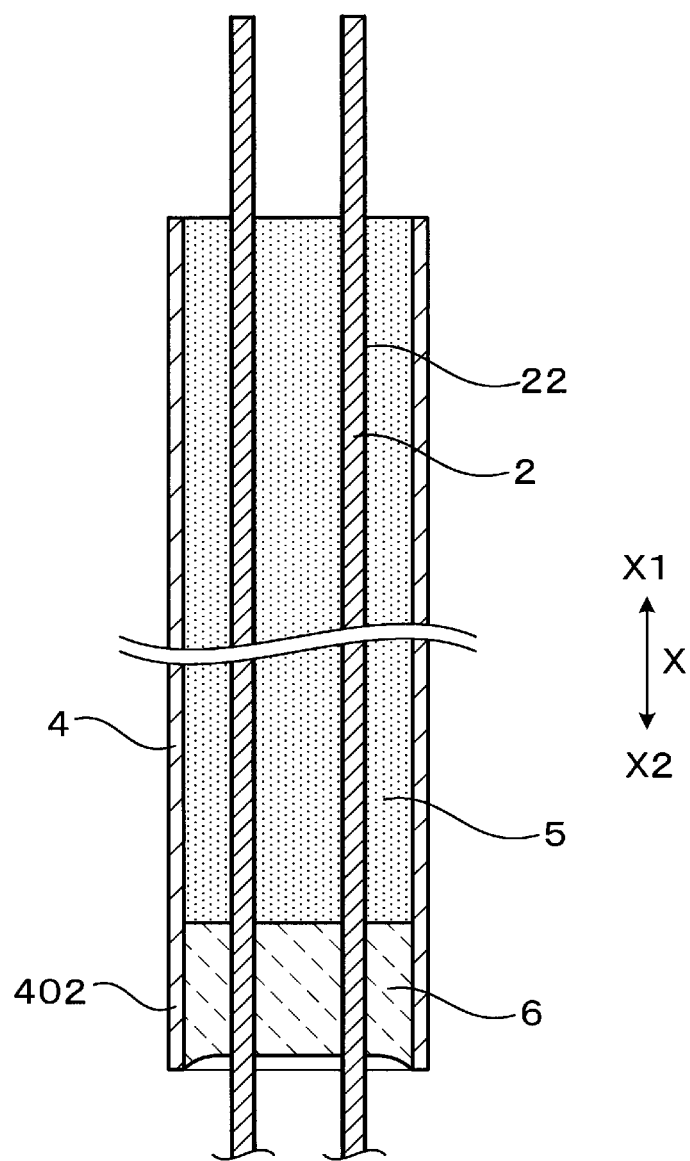
FIG. 19 is a diagram illustrating a state in which an insulator has been filled in an outer tube in a process of preparing another thermocouple, according to an embodiment.
Figure 20:
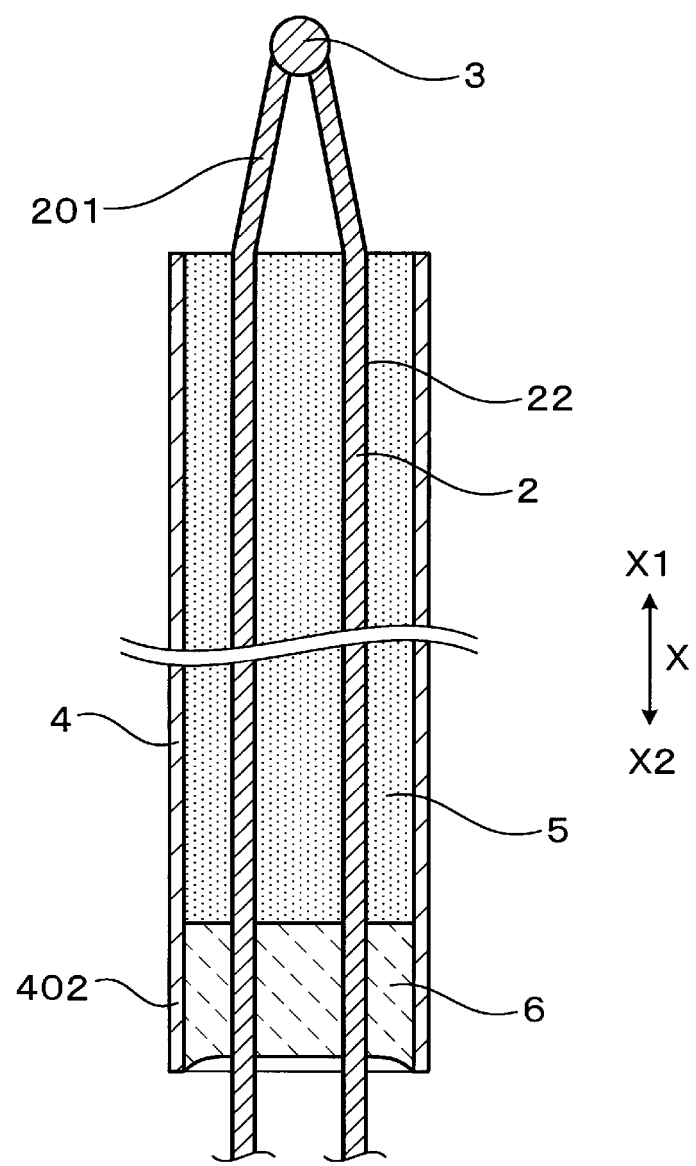
FIG. 20 is a diagram illustrating a state in which a temperature measuring junction has been formed at the tip ends of a pair of thermocouple wires in a process of preparing another thermocouple, according to an embodiment.

The thermocouple 11 can also be prepared as follows without using a sheathed pin 12. First, as shown in FIG. 17, a pair of thermocouple wires 2 are inserted into the inner periphery of an outer tube 4. In this case, the pair of thermocouple wires 2 are heated to 500° C. to 800° C. for an appropriate time in an atmosphere where air is present to form passive films 22 on the surfaces of the pair of thermocouple wires 2. Then, as shown in FIG. 18, a glass seal 6 is filled in the base end 402 of the outer tube 4 using a tablet 60. Then, as shown in FIG. 19, the direction of the outer tube 4 is changed upside down so that the glass seal 6 is located at the bottom, and an insulator 5 is filled in the outer tube 4 from above the glass seal 6. Then, as shown in FIG. 20, tip ends 201 of the pair of thermocouple wires 2 are fused together to form a temperature measuring junction 3. After that, a tip end cover 42 can be mounted to the tip end 401 of the outer tube 4 to thereby prepare a thermocouple 11.

Advantageous Effects

In the temperature sensor 1 of the present embodiment, passive films 22 are deliberately formed on the surfaces of a pair of thermocouple wires 2 so that further passive films 22 are less likely to be formed on the surfaces of the pair of thermocouple wires 2 during use of the temperature sensor 1. Specifically, when producing the temperature sensor 1, the metallic materials on the surfaces of a pair of thermocouple wires 2 are deliberately oxidized to form passive films 22 on the surfaces of the pair of thermocouple wires 2. In a state where the temperature sensor 1 has been completed, the pair of thermocouple wires 2 on which the passive films 22 are formed are held in the outer tube 4 and isolated from the outside.

Thus, if oxygen has been in the outer tube 4 at the time of using the temperature sensor 1, the presence of the passive films 22 prevents further oxidization of the pair of thermocouple wires 2 by the oxygen. Therefore, the material compositions of the conductive portions 21 are prevented from suffering further changes in the pair of thermocouple wires 2 during use of the temperature sensor 1. As a result, errors are less likely to occur in the electromotive force generated in the pair of thermocouple wires 2 during use of the temperature sensor 1.

Accordingly, in the temperature sensor 1 of the present embodiment, errors are less likely to occur in the output temperature measured by the temperature sensor 1.

The temperature measuring device 100 of the present embodiment includes the control unit 8 which is used for temperature measurement performed by the temperature sensor 1. The control unit 8 is configured to correct an error occurring in the output temperature due to the passive films 22 being formed on the pair of thermocouple wires. Thus, the control unit 8 can calculate an output temperature for the temperature sensor 1, considering the error that may occur in the electromotive force of the pair of thermocouple wires 2 due to the formation of the passive films 22. Accordingly, in the temperature measuring device 100 of the present embodiment, errors are less likely to occur in the output temperature measured by the temperature sensor 1, and the output temperature can be more accurately calculated for the temperature sensor 1.

In the temperature sensors having a sheathed thermocouple of the conventional art, the pair of thermocouple wires 2 are brought into a state in which almost no passive films 22 are formed on the surfaces thereof at the initial stage of producing the temperature sensors. This is because the passive films 22 may cause changes in the material compositions of the conductive portions 21 of the pair of thermocouple wires 2 and may be the factor of impairing the measurement characteristics of the temperature sensors using the thermocouple wires 2.

However, when sealing the outer tube 4 from inside thereof by filling the glass seal 6 in the tip end 402 of the outer tube 4 in the process of producing the temperature sensor 1, air may remain on the inside of the outer tube 4. Accordingly, when the temperature sensor 1 is heated by the measurement target gas G during use, the oxygen in the air inside the outer tube 4 may gradually oxidize the surfaces of the pair of thermocouple wires 2. Therefore, as the time of using the temperature 1 becomes longer, a larger error may occur in the electromotive force of the pair of thermocouple wires 2, causing an even larger error in the output temperature of the temperature sensor 1.

The temperature sensor 1 of the present embodiment aims to prevent change in the output characteristics of the temperature sensor 1 over time due to possible errors occurring in the output temperature becoming gradually larger. In the temperature sensor 1 of the present embodiment, passive films 22 are deliberately formed on the surfaces of the pair of thermocouple wires 2 at the initial stage of the production. Accordingly, if the temperature sensor 1 is used for a long time, the thicknesses of the passive films 22 of the pair of thermocouple wires 2 are less likely to change, and the output characteristics of the temperature sensor 1 are less likely to change over time.

For this reason, the temperature sensor 1 of the present embodiment can improve the accuracy of measuring temperature. In other words, the temperature sensor 1 of the present embodiment is less likely to cause changes in the oxygen concentration of the air remaining in the outer tube 4.

EXAMPLES

The present example shows the sheathed thermocouple 11 of the temperature sensor 1 of the embodiment as an example. The passive films 22 formed on the pair of thermocouple wires 2 of the sheathed thermocouple 11 were examined in terms of thickness.

The pair of thermocouple wires 2 of the present example were configured by the N-type sheathed thermocouple 11. The outer tube 4 of the present example had an inner diameter of $\phi$2.3 mm and a thickness of 0.3 mm, and was made of a material of NCF601 (super stainless steel). The insulator 5 of the present example was made of MgO powder. The glass seal 6 of the present example had an outer diameter of $\phi$1.5 mm, a length of 1.5 mm and a porosity of 2.5 vol %, and was made of Pb-based glass (with a PbO content of 70 mass %).

When preparing the sheathed thermocouple 11 of the present example, a sheathed pin 12 was placed in a furnace at a temperature of 600° C. and heated for 4 hours. It was confirmed that passive films 22 with a thickness of 1.0 μm were formed on the surfaces of the pair of thermocouple wires 2. In the present example, the method of preparing the rest of the sheathed couple 11 is the same as in the embodiment.

The present disclosure should not be construed as being limited to the embodiment, but different embodiments can be configured without departing from the scope of the disclosure. The present disclosure should encompass various modifications and other modifications within equivalent theory.

What is claimed is:
1. A temperature sensor comprising:
   a pair of thermocouple wires made of respective metallic materials different from each other;
   a temperature measuring junction formed by joining tip ends of the pair of thermocouple wires together;
   an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom;
   an insulator made of an insulating material and disposed in the outer tube to insulate the pair of thermocouple wires from the outer tube and fix the pair of thermocouple wires to the outer tube; and
   a glass seal made of a glass material and filled in at least either of the base end of the outer tube or a holder mounted to the base end of the outer tube to seal the outer tube, wherein
   the pair of thermocouple wires disposed in the outer tube have surfaces where passive films are respectively formed on the surfaces of the pair of thermocouple wires due to oxidization of the metallic materials,
   the pair of thermocouple wires from an N-type thermocouple;
   the pair of thermocouple wires include a positive-leg thermocouple wire comprising Ni, Cr and Si;
   the pair of thermocouple wires include a negative-leg thermocouple wire comprising Ni and Si;
   the passive film formed on the surface of the positive-leg thermocouple wire comprises Cr-oxide or Ni-oxide at a highest content; and
   the passive film formed on the surface of the negative-leg thermocouple wire comprises Ni-oxide at a highest content.
2. The temperature sensor according to claim 1, wherein the passive films each have a thickness in a range of 0.3 μm to 10 μm.
3. The temperature sensor according to claim 1, wherein the passive films are formed by oxidation of the surfaces of the pair of thermocouple wires prior to sealing the outer tube from inside thereof by the glass seal.
4. The temperature sensor according to claim 1, wherein the temperature sensor comprises the holder mounted to the base end of the outer tube; and the glass seal is filled in the holder to seal the base end of the outer tube.

5. The temperature sensor according to claim 4, wherein an inner diameter of the holder is larger than that of the outer tube.

6. The temperature sensor according to claim 4, wherein the glass seal is filled in the holder up to a level of a maximum diameter of the holder.

7. A temperature measuring device comprising a temperature sensor and a control unit electrically connected to the temperature sensor and used for temperature measurement performed by the temperature sensor, wherein:

the temperature sensor comprises:

a pair of thermocouple wires made of respective metallic materials different from each other, a temperature measuring junction formed by joining tip ends of the pair of thermocouple wires together, an outer tube made of a metallic material and having a tip end and a base end, the tip end holding the temperature measuring junction therein or having a tip end cover mounted thereto in which the temperature measuring junction is held, the base end allowing the pair of thermocouple wires to protrude therefrom, an insulator made of an insulating material and disposed in the outer tube to insulate the pair of thermocouple wires from the outer tube and fix the pair of thermocouple wires to the outer tube, and a glass seal made of a glass material and filled in at least either of the base end of the outer tube or a holder mounted to the base end of the outer tube to seal the outer tube;

wherein the pair of thermocouple wires disposed in the outer tube have surfaces where passive films are respectively formed on the surfaces of the pair of thermocouple wires due to oxidization of the metallic materials; and the control unit is configured to calculate an output temperature for the temperature sensor based on changes in electromotive force generated in the pair of thermocouple wires and correct for an error occurring in the output temperature due to the passive films being formed.

* * * * *